(12) United States Patent
Zhang et al.

(10) Patent No.: US 11,733,564 B2
(45) Date of Patent: Aug. 22, 2023

(54) CURVED BACKLIGHT MODULE AND DISPLAY DEVICE

(71) Applicants: Beijing BOE Display Technology Co., Ltd., Beijing (CN); BOE Technology Group Co., Ltd., Beijing (CN)

(72) Inventors: Yu Zhang, Beijing (CN); Huiyan Li, Beijing (CN); Lijin Zhao, Beijing (CN); Shixin Geng, Beijing (CN); Bochang Wang, Beijing (CN)

(73) Assignees: Beijing BOE Display Technology Co., Ltd., Beijing (CN); BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 17/761,514

(22) PCT Filed: May 12, 2021

(86) PCT No.: PCT/CN2021/093283
§ 371 (c)(1),
(2) Date: Mar. 17, 2022

(87) PCT Pub. No.: WO2021/254035
PCT Pub. Date: Dec. 23, 2021

(65) Prior Publication Data
US 2022/0365395 A1 Nov. 17, 2022

(30) Foreign Application Priority Data
Jun. 18, 2020 (CN) .......................... 202010557239.4

(51) Int. Cl.
*G02F 1/00* (2006.01)
*G02F 1/13357* (2006.01)

(52) U.S. Cl.
CPC .. *G02F 1/133608* (2013.01); *G02F 1/133603* (2013.01)

(58) Field of Classification Search
None
See application file for complete search history.

(56) References Cited

U.S. PATENT DOCUMENTS

| | | | |
|---|---|---|---|
| 2001/0046131 A1 | 11/2001 | Hoelen et al. | |
| 2013/0118114 A1 | 5/2013 | Brailsford et al. | |

(Continued)

FOREIGN PATENT DOCUMENTS

| | | | |
|---|---|---|---|
| CN | 1199077 C | 4/2005 | |
| CN | 103578360 A | 2/2014 | |

(Continued)

OTHER PUBLICATIONS

CN202010557239.4 first office action.

*Primary Examiner* — Gerald J Sufleta, II
(74) *Attorney, Agent, or Firm* — IPro, PLLC

(57) ABSTRACT

Disclosed are a curved backlight module and a display device. The curved backlight module includes: an optical film and a lamp board which are oppositely provided, the distance between the optical film and the lamp board being referred to as an optical cavity height; the lamp board is provided with a plurality of lamp bars which extend in a first direction and are arranged in a second direction, a plurality of lamp beads distributed in an array are provided on each of the lamp bars, and the distribution parameters of the lamp beads on each of the lamp bars are the same; and on each of the lamp bars, there is a first distance between two adjacent lamp beads in the first direction, and there is a second distance between two adjacent lamp beads in the second direction.

13 Claims, 13 Drawing Sheets

(56) References Cited

U.S. PATENT DOCUMENTS

| | | | |
|---|---|---|---|
| 2015/0029698 A1* | 1/2015 | Huang | G02F 1/133305 |
| | | | 362/97.1 |
| 2015/0103522 A1 | 4/2015 | Liu et al. | |
| 2015/0253623 A1* | 9/2015 | Lee | G02F 1/133305 |
| | | | 362/97.3 |
| 2016/0018591 A1 | 1/2016 | Lee | |
| 2016/0044776 A1 | 2/2016 | Park et al. | |
| 2016/0238894 A1 | 8/2016 | Choi | |
| 2016/0282669 A1* | 9/2016 | Lee | G02F 1/133605 |
| 2016/0334565 A1 | 11/2016 | Wang | |
| 2020/0166808 A1* | 5/2020 | Lee | G02B 6/0003 |
| 2021/0405455 A1* | 12/2021 | Hong | G02F 1/133608 |

FOREIGN PATENT DOCUMENTS

| | | |
|---|---|---|
| CN | 104565988 A | 4/2015 |
| CN | 104896363 A | 9/2015 |
| CN | 104932144 A | 9/2015 |
| CN | 103926746 B | 6/2016 |
| CN | 105892121 A | 8/2016 |
| CN | 208861602 U | 5/2019 |
| CN | 110412796 A | 11/2019 |
| TW | 201604625 A | 2/2016 |

\* cited by examiner

CURVED BACKLIGHT MODULE AND DISPLAY DEVICE

CROSS-REFERENCE TO RELATED APPLICATION

The present application is a US National Stage of International Application No. PCT/CN2021/093283, filed on May 12, 2021, which claims the priority of Chinese Patent Application No. 202010557239.4, filed to the Chinese Patent Office on Jun. 18, 2020 and entitled "CURVED BACKLIGHT MODULE AND DISPLAY DEVICE", which is incorporated in its entirety herein by reference.

FIELD

The present disclosure relates to the technical field of displaying, and in particular to a curved backlight module and a display device.

BACKGROUND

The backlight module is required to provide the backlight source to achieve a displaying function for the liquid crystal display which a non-self-luminous apparatus. At present, the backlight module is generally formed by the light emitting diode (LED) substrate with a plurality of mini LED chips distributed in an array, thereby providing the liquid crystal display with the screen effect with the high dynamic range, a more exquisite display picture, etc.

Driven by technological development, a curved liquid crystal display has emerged. However, the curved liquid crystal display features the uneven light emission, which leads to the decline in display effect of the curved liquid crystal display.

SUMMARY

A curved backlight module according to the embodiment of the present disclosure includes: an optical film and a lamp board which are oppositely arranged, where the distance between the optical film and the lamp board refers to an optical cavity height; the lamp board has a plurality of lamp bars which extend in a first direction and are arranged in a second direction, a plurality of lamp beads distributed in an array are provided on each of the lamp bars, and distribution parameters of the lamp beads on each of the lamp bars are the same; on each of the lamp bars, a first distance is provided between two adjacent lamp beads in the first direction, and a second distance is provided between two adjacent lamp beads in the second direction; and the first distance and the second distance are adjusted so that the ratio of the optical cavity height to the first distance and the ratio of the optical cavity height to the second distance are both greater than a first preset value, and the difference between the ratio of the optical cavity height to the first distance and the ratio of the optical cavity height to the second distance is less than a second preset value, to enable the uniformity of the light-emitting brightness of the curved backlight module to be not less than 75%.

Optionally, in the curved backlight module according to the embodiment of the present disclosure, when the lamp beads are provided with secondary lenses, the ratio of the optical cavity height to the first distance is greater than or equal to 0.35 and less than or equal to 1, and the ratio of the optical cavity height to the second distance is greater than or equal to 0.35 and less than or equal to 1; when the lamp beads are not provided with secondary lenses, the ratio of the optical cavity height to the first distance is greater than or equal to 1, and the ratio of the optical cavity height to the second distance is greater than or equal to 1.

Optionally, in the curved backlight module according to the embodiment of the present disclosure, in the first direction, a first distance between adjacent lamp beads on a lamp bar close to an edge of the lamp board is less than a first distance between adjacent lamp beads on a lamp bar close to a center of the lamp board, and the first distance between adjacent lamp beads on the lamp bar close to the center of the lamp board is less than a first distance between adjacent lamp beads on a lamp bar between the lamp bar close to the edge of the lamp board and the lamp bar close to the center of the lamp board; and in the second direction, a second distance between adjacent lamp beads on the lamp bar close to the edge of the lamp board is less than a second distance between adjacent lamp beads on the lamp bar close to the center of the lamp board, and the second distance between adjacent lamp beads on the lamp bar close to the center of the lamp board is less than a second distance between adjacent lamp beads on the lamp bar between the lamp bar close to the edge of the lamp board and the lamp bar close to the center of the lamp board.

Optionally, in the curved backlight module according to the embodiment of the present disclosure, on each of the lamp bars, the number of lamp beads in the first direction is greater than 1, the lamp beads in the first direction are connected in series, and lamp beads in the second direction are connected in parallel.

Optionally, in the curved backlight module according to the embodiment of the present disclosure, at least two adjacent rows of the lamp beads form one backlight partition, and lamp beads in each backlight partition share a positive electrode and a negative electrode.

Optionally, in the curved backlight module according to the embodiment of the present disclosure, each of the lamp bars has a connector, and the connector includes binding terminals corresponding one-to-one to positive electrodes and negative electrodes; and the curved backlight module further includes at least two adapters, each of the adapters includes a plurality of input interfaces and a plurality of output interfaces, the input interfaces on each of the adapters are electrically connected one-to-one to connectors on the lamp bars, and the number of the output interfaces are less than that of the input interfaces.

Optionally, in the curved backlight module according to the embodiment of the present disclosure, the number of the lamp bars connected to each of the adapters is the same.

Optionally, in the curved backlight module according to the embodiment of the present disclosure, the input interfaces on each of the adapters are each provided with a plurality of input terminals, and the output interfaces on each of the adapters are each provided with a plurality of output terminals, and on each adapter, the total number of the input terminals is the same as that of the output terminals; and each of the input terminals is electrically connected to one of the output terminals, some of the output terminals are floating terminals, and one of the output terminals is electrically connected to at least two of the input terminals.

Correspondingly, the embodiment of the present disclosure further provides a display device, including: a display panel, and the curved backlight module according to the embodiment of the present disclosure, located at a light incident side of the display panel.

Optionally, in the display device according to the embodiment of the present disclosure, the display panel has a display area, and a distance between a lamp bead located at an edge of the curved backlight module and an edge of the display area is less than or equal to ½ of the distance between adjacent lamp beads.

Optionally, the display device according to the embodiment of the present disclosure further includes a mold frame for fixing the curved backlight module to the light incident side of the display panel, where the lamp board of the curved backlight module is fixed to a bottom wall, facing the display panel, of the mold frame; a side wall of the mold frame is arranged obliquely, and an included angle between an extension direction of the side wall and the first direction is less than or equal to 90°.

Optionally, in the display device according to the embodiment of the present disclosure, the included angle is greater than or equal to 41° and less than or equal to 90°.

Optionally, in the display device according to the embodiment of the present disclosure, the side wall is polished, sprayed with a reflective material, or pasted with a silvered reflector.

DETAILED DESCRIPTION OF THE EMBODIMENTS

Figure 1A:
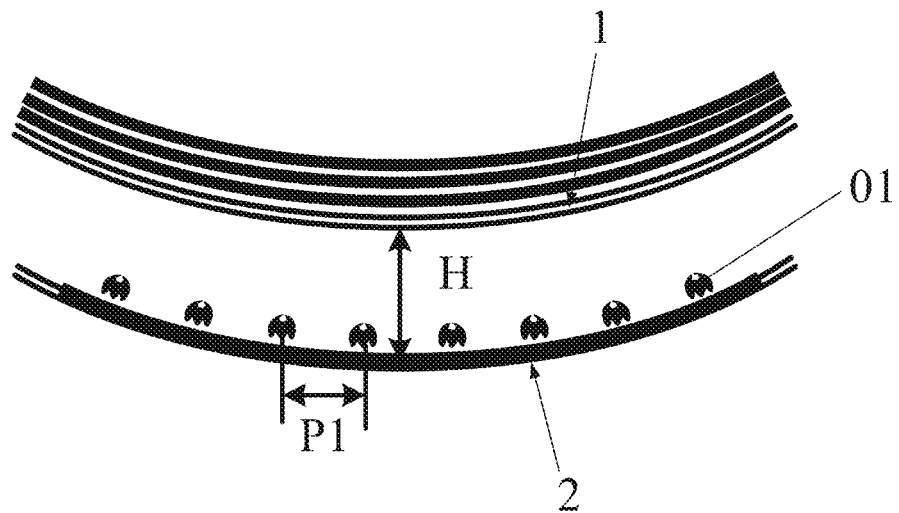
FIGS. 1A and 1B are schematic diagrams showing two optical cavity heights of a curved backlight module, respectively.

To make the objectives, technical solutions, and advantages in the embodiments of the present disclosure more clear, the technical solutions in the embodiments of the present disclosure will be clearly and completely described below in combination with the accompanying drawings in the embodiments of the present disclosure. It is obvious that the described embodiments are some embodiments of the present disclosure, not all of them. The embodiments in the present disclosure and features in the embodiments may be combined with one another without conflict. Based on the described embodiments of the present disclosure, all other embodiments obtained by a person of ordinary skill in the art without inventive efforts fall within the scope of protection of the present disclosure.

Unless defined otherwise, the technical or scientific terms used in the present disclosure should be of ordinary meaning as understood by a person of ordinary skill in the art to which the present disclosure pertains. The word "comprising", "including" or the like used in the present disclosure is intended to mean that an element or item in front of the word encompasses elements or items present behind the word and equivalents thereof, without excluding other elements or items. The word "connection", "connected" or the like is not limited to the physical or mechanical connection, but may include the electrical connection, regardless of being direct or indirect. "Inner", "outer", "upper", "lower", etc. are merely used to indicate a relative positional relation, and when the absolute position of a described object is changed, the relative positional relation may also be changed accordingly.

It should be noted that sizes and shapes of graphs in the accompanying drawings do not reflect true ratios, and are merely intended to schematically describe contents of the present disclosure. In addition, the same or similar reference numerals represent the same or similar elements or elements having the same or similar function throughout.

Figure 1B:
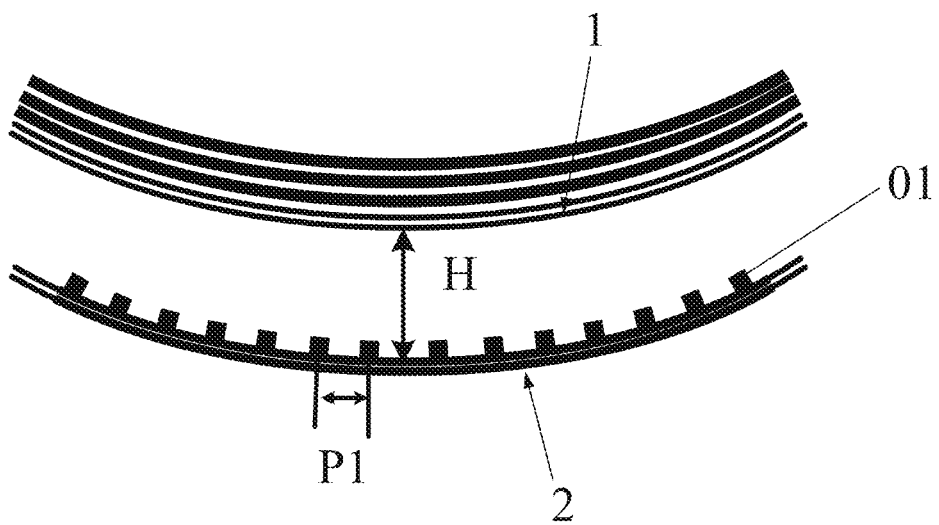

Provided in the embodiments of the present disclosure is a curved backlight module. FIGS. 1A-1B merely show structural schematic diagrams of a part of the curved backlight module. As shown in FIGS. 1A-1B, the curved backlight module includes: an optical film 1 and a lamp board 2 which are oppositely arranged, and the distance between the optical film 1 and the lamp board 2 is referred to as an optical cavity height H.

Figure 2:
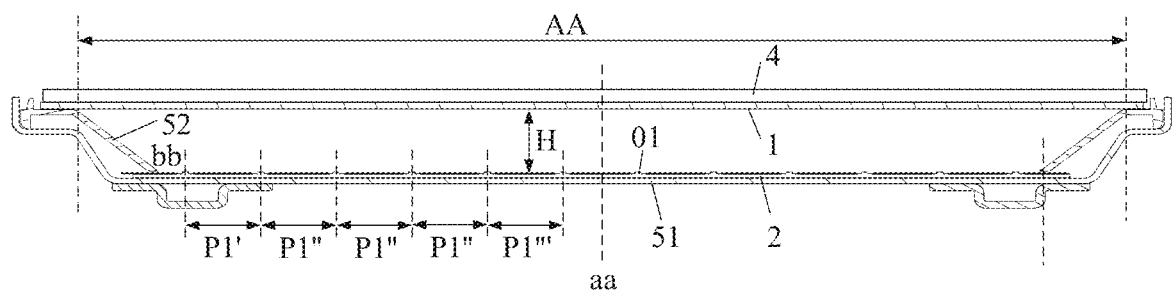
FIG. 2 is a schematic sectional view of a display device according to an embodiment of the present disclosure.
Figure 3:
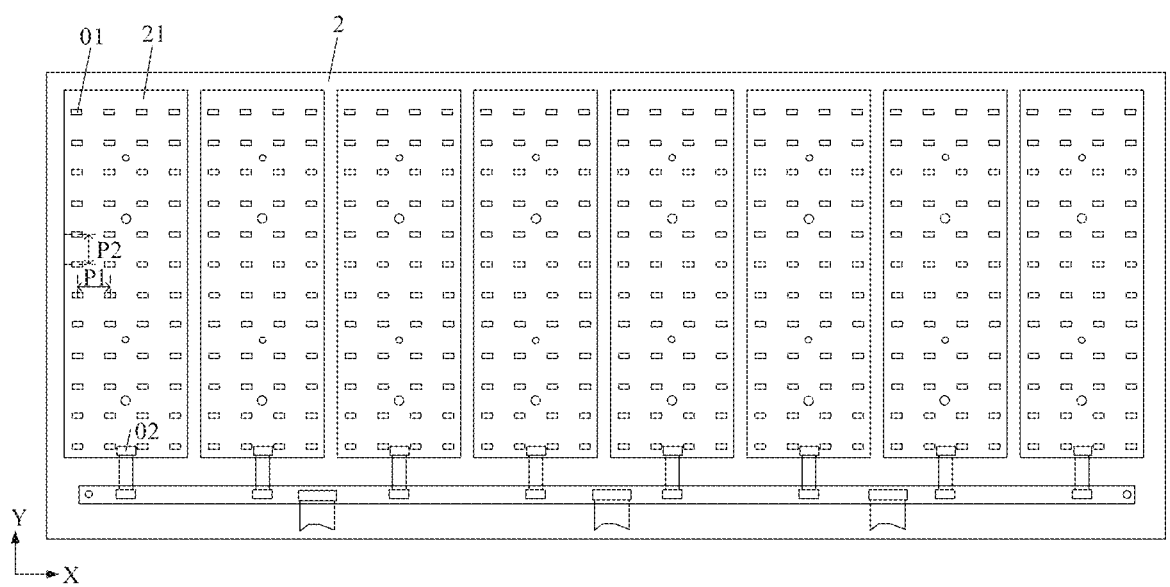
FIG. 3 is a schematic top view corresponding to FIG. 2.

FIG. 2 is a schematic sectional view of a display device provided with the curved backlight module according to the embodiment of the present disclosure, and FIG. 3 is a schematic top view of the lamp board 2. As shown in FIGS. 2-3, the lamp board 2 has a plurality of lamp bars 21 which extend in a first direction X and are arranged in a second direction Y, a plurality of lamp beads 01 distributed in an array are provided on each of the lamp bars 21, and distribution parameters of the lamp beads 01 on each of the lamp bars 21 are the same. Particularly, the distribution parameters of the lamp beads 01 are the distance between adjacent lamp beads in the first direction X and the distance between adjacent lamp beads in the second direction Y.

On each of the lamp bars 21, a first distance P1 is arranged between two adjacent lamp beads 01 in the first direction X, and a second distance P2 is arranged between two adjacent lamp beads 01 in the second direction Y; and the first distance P1 and the second distance P2 are adjusted so that the ratio H/P1 of the optical cavity height H to the first distance P1 and the ratio H/P2 of the optical cavity height H to the second distance P2 are both greater than a first preset value, and the difference between the ratio H/P1 of the optical cavity height H to the first distance P1 and the ratio H/P2 of the optical cavity height H to the second distance P2 is less than a second preset value, such that the uniformity of the light-emitting brightness of the curved backlight module is not less than 75%.

In the curved backlight module according to the embodiment of the present disclosure, the distance between adjacent lamp beads 01 in the first direction X and the distance between adjacent lamp beads 01 in the second direction Y on each of the lamp bars 21 are adjusted so that the ratio H/P1 of the optical cavity height H to the first distance P1 and the ratio H/P2 of the optical cavity height H to the second distance P2 may be both greater than the first preset value, and the difference between the ratio H/P1 of the optical cavity height H to the first distance P1 and the ratio H/P2 of the optical cavity height H to the second distance P2 may be less than the second preset value, that is, the H/P1 and the H/P2 may be set to be approximately the same. In other words, the closer the first distance P1 and the second distance P2 are, the smaller the frame difference is. Therefore, the uniformity of the light-emitting brightness of the curved backlight module is desirable and may be greater than or equal to 75%, thereby improving a display effect of a curved liquid crystal display screen.

During specific implementation, the curved backlight module according to the embodiment of the present disclosure has a length of 1212.38 mm and a width of 253.1 mm; an effective display area of the module has a length of 1190.03 mm and a width of 223.88 mm; upper, lower, left, and right borders of the module have widths of 9.7 mm, 16.4 mm, 9.6 mm, and 9.6 mm, respectively; and the module has a thickness of 30.53 mm and a curvature radius R of 4200±2 mm.

As shown in FIG. 3, the curved backlight module according to the embodiment of the present disclosure features a direct light incidence manner. An architecture of the optical film 1 may be divided into a low gain type and a high gain type, which correspond to a curved backlight module with high brightness greater than or equal to 1000 nit and a curved backlight module with low brightness less than 1000 nit, respectively. The lamp bead 01 (light emitting diode (LED) for short hereinafter) is divided into one type with secondary lenses and the other type without secondary lenses. The LEDs with the secondary lenses may improve a light divergence effect, are spaced from each other by a great distance, and generally have package sizes of 3 mm in length and 3 mm in width (3030 for short), or 3.5 mm in length and 2.8 mm in width (3528 for short), etc. . . . The LEDs without the secondary lenses are low in power, large in light-emitting angle, and great in number, and generally have package sizes of 3 mm in length and 1.4 mm in width (3014 for short), 4 mm in length and 1.4 mm in width (4014 for short), or 7 mm in length and 2 mm in width (7020 for short), etc. . . .

During specific implementation, the LEDs with different package sizes have different arrangement and driving solutions. For the curved backlight module with the direct light incidence, in the curved backlight module according to the embodiment of the present disclosure, as shown in FIG. 1A, the lamp beads 01 are provided with the secondary lenses. In order to ensure a limit condition of the display picture uniformity, according to design requirements, the LEDs with the secondary lenses should meet: the ratio of the optical cavity height H to the first distance P1 is greater than or equal to 0.35 and less than or equal to 1, and the ratio of the optical cavity height H to the second distance P2 is greater than or equal to 0.35 and less than or equal to 1. FIG. 1A merely shows the first distance P1 in the first direction X.

As shown in FIG. 1B, the lamp beads 01 are not provided with the secondary lenses. In order to ensure a limit condition of the display picture uniformity, according to design requirements, the LEDs without the secondary lenses should meet: the ratio of the optical cavity height H to the first distance P1 is greater than 1, and the ratio of the optical cavity height H to the second distance P2 is greater than 1. FIG. 1B merely shows the second distance P2 in the first direction X.

Figure 4A:
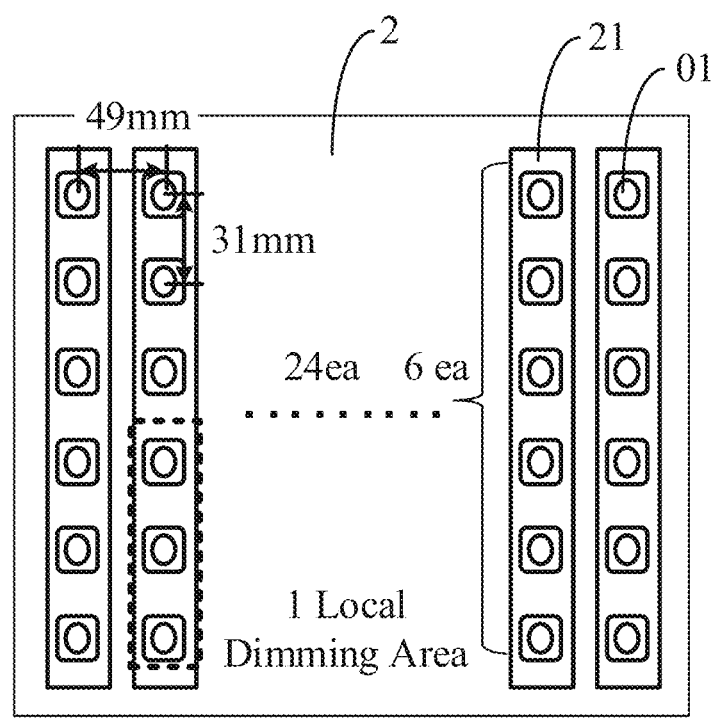
FIGS. 4A-4C are schematic diagrams of three lamp bead distributions of a lamp board, respectively.
Figure 4B:
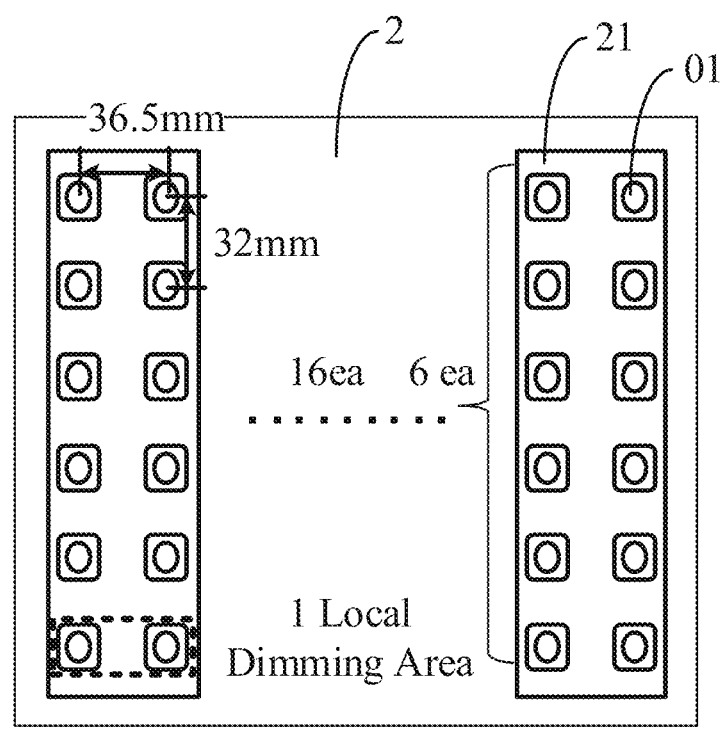
Figure 4C:
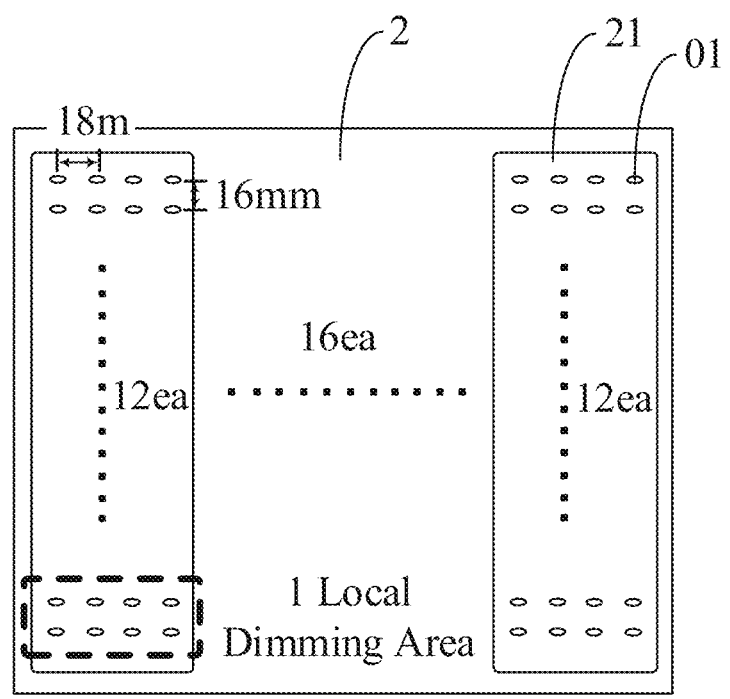

The present disclosure lists three comparison solutions of the uniformity of the light-emitting brightness of the curved backlight module with the LEDs having different distribution parameters on the lamp bars, as shown in Table 1. Based on the module architecture shown in FIGS. 1A-1B, the optical cavity height H is 18 mm, the LEDs with the secondary lenses have the limit distance of 49 mm, and the LEDs without the secondary lenses have the limit distance of 18 mm, to ensure that the uniformity of the light-emitting brightness is greater than or equal to 75%. Lamp board designs corresponding to solution 1, solution 2, and solution 3 are shown in FIG. 4A, FIG. 4B, and FIG. 4C, respectively, where ea denotes the number.

TABLE 1

|  | Solution 1 | Solution 2 | Solution 3 |
| --- | --- | --- | --- |
| Architecture of optical film | Diffusion film + brightness enhancement film + diffusion film (low brightness) Polarized brightness enhancement film + cross brightness enhancement film (high brightness) | | |
| LED type | 3030/3528 (with second lens) | 3030/3528 (with second lens) | 3014/4014/7020 (without second lens) |
| Number (ea) of LEDs arranged in directions X and Y | 144→24 (X) × 6 (Y) | 192→32 (X) × 6 (Y) | 768→64 (X) × 12 (Y) |
| LED distance | 49 mm × 31 mm | 36.5 mm × 32 mm | 18 mm × 16 mm |
| H/P1, H/P2 | 0.37, 0.58 | 0.49, 0.56 | 1, 1.125 |
| Number (ea) of LEDs in each backlight partition | 3 | 2 | 8 |
| Number (ea) of LEDs on each lamp bar | 6 | 12 | 48 |

TABLE 1-continued

|  | Solution 1 | Solution 2 | Solution 3 |
| --- | --- | --- | --- |
| Uniformity of light-emitting brightness of curved backlight module | 80% (9 points) | 89% (9 points) | 92% (9 points) |

As shown in Table 1 described above, the present disclosure tests the uniformity of the light-emitting brightness of the curved backlight modules corresponding to the three solutions described above, that is, the brightness of different point sites on a light-emitting surface is tested, and (minimum value/maximum value)*100% is the uniformity of the light-emitting brightness of the curved backlight module. 9 or 13 points are tested conventionally, and 9 points are tested in the present disclosure. It can be seen that solution 3 adopts a design without the secondary lenses, H/P1 in the first direction X and H/P2 in the second direction Y are greater and closer, and the uniformity of the light brightness is also greater. Therefore, the closer and greater the H/P1 in the first direction X and the H/P2 in the second direction Y are, the greater picture uniformity is.

During specific implementation, the lamp bars from the edge to the center of the lamp board are divided into three parts, a first part is lamp bars close to the edge of the lamp board, a third part is lamp bars close to the center of the lamp board, and a second part is lamp bars between the first part and the third part. In order to increase the brightness of the edge of a display area, the distance between the LED lamp beads on a lamp bar in the first part are minimized. Since a brightness specification defined by a display product generally depends on the brightness of the center of the display area, in order to ensure the brightness of the center of the display area, it is required to narrow the distance between the LEDs on a lamp bar in the third part, to increase the brightness of the center of the display area. Then the distance between the LEDs on a lamp bar in the second part between the lamp bar in the first part and the lamp bar in the third part is widened, to make light intensity more dispersed, that is, to lower the brightness of an area between the lamp bar in the first part and the lamp bar in the third part, so that the brightness of the edge (of the first part) and the brightness of an adjacent area (of the second part) are kept visually similar without an obvious brightness difference, and human eyes cannot observe a change from a dark area to a bright area. Therefore, in the curved backlight module according to the embodiment of the present disclosure, as shown in FIG. 2, in the first direction X, a first distance (P1') between adjacent lamp beads 01 on a lamp bar 21 close to an edge bb of the lamp board 2 is less than a first distance (P1''') between adjacent lamp beads 01 on a lamp bar 21 close to a center aa of the lamp board 2, and the first distance (P1''') between adjacent lamp beads 01 on the lamp bar 21 close to the center aa of the lamp board 2 is less than a first distance (P1'') between adjacent lamp beads 01 on a lamp bar 21 between the lamp bar close to the edge bb of the lamp board 2 and the lamp bar close to the center aa of the lamp board 2.

Similarly, in the second direction Y, a second distance between adjacent lamp beads on a lamp bar close to an edge of the lamp board is less than a second distance between adjacent lamp beads on a lamp bar close to a center of the lamp board, and the second distance between adjacent lamp beads on the lamp bar close to the center of the lamp board is less than a second distance between adjacent lamp beads on a lamp bar between the lamp bar close to the edge of the lamp board and the lamp bar close to the center of the lamp board.

It should be noted that FIG. 2 in the embodiment of the present disclosure merely shows an arrangement manner of the lamp beads in the first direction X; and on each of the lamp bars, an arrangement manner of the lamp beads in the second direction is the same as that of the lamp beads in the first direction X.

The design of the distances between adjacent lamp beads in the first direction and the second direction disclosed in the embodiment of the present disclosure may improve the uniformity of the light-emitting brightness of a backlight module. However, for a curved display module, under bending stress, compressive light leakage is likely to occur at four corners. Especially for vehicle-mounted products, the surface uniformity is required to reach 70% in a bright state (at a gray scale 255) and 30% in a dark state (at a gray scale 0). In order to alleviate light leakage at the four corners of the curved module, the LEDs may adopt local dimming design, which may effectively control corresponding light field areas by partitions, thereby alleviating uneven brightness of the module in a dark state. A local dimming partition rule is as follows: 1. the more local dimming partitions in the effective display area are, the finer picture control is; 2. the closer the H/P1 of the LEDs in the first direction X and the H/P2 of the LEDs in the second direction are, the finer picture control is; and 3. the partitions are approximately circular, that is, the number of the LEDs in the first direction and the number of the LEDs in the second direction in each of the partitions are the same, so that the partitions are not too long in a certain direction.

Figure 5A:
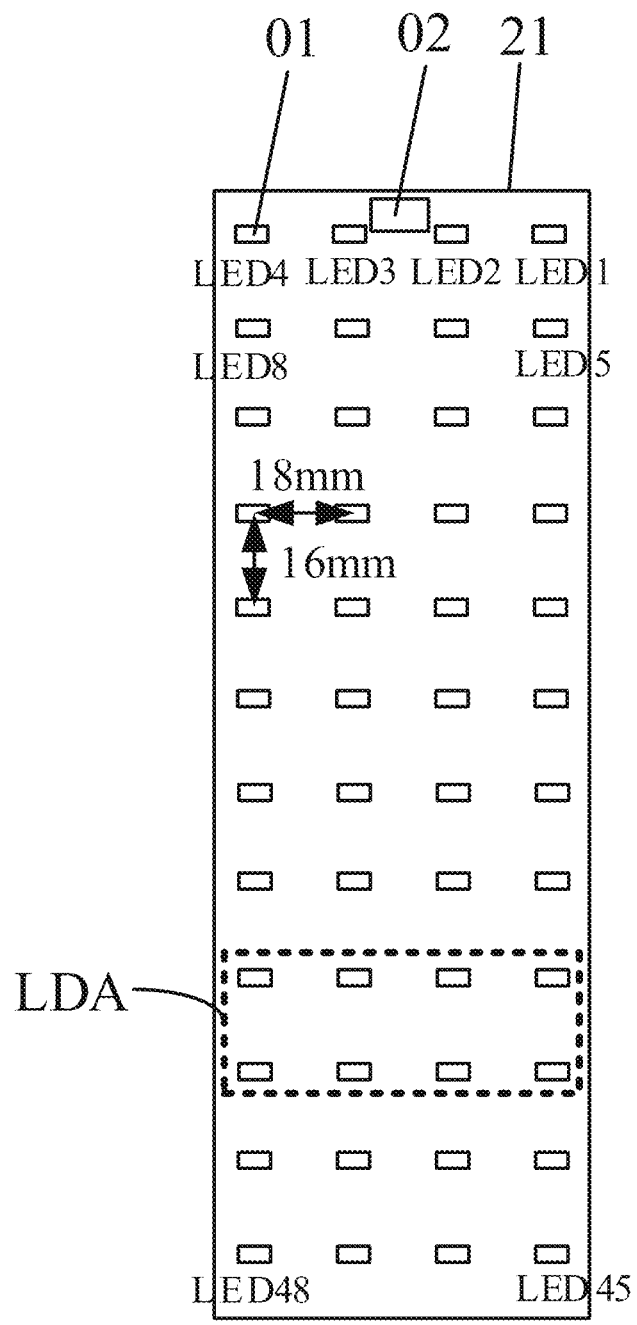
FIG. 5A is a structural schematic diagram of a lamp bar in FIG. 3.

Preferably, in the present disclosure, a lamp bead partition design is employed in solution 2 (FIG. 4B) and solution 3 (FIG. 4C) in Table 1 described above. Solution 3 is particularly preferable, where an LED type is 3014, and a light-emitting angle in the directions X/Y is 120°. Therefore, during specific implementation, in the a curved backlight module according to the embodiment of the present disclosure, as shown in FIG. 5A, one lamp bar 21 is exemplarily described, for example, on each of the lamp bars 21, more than one lamp bead 01 (4 lamp beads, for example) is provided in the first direction X, and 12 lamp beads 01 are provided in the second direction Y. Since a length in the first direction of the lamp bar 21 is generally less than that in the second direction Y, different backlight partitions are generally arranged in the second direction Y, the lamp beads 01 arranged in the first direction X are connected in series, and the lamp beads 01 arranged in the second direction Y are connected in parallel.

Figure 5B:
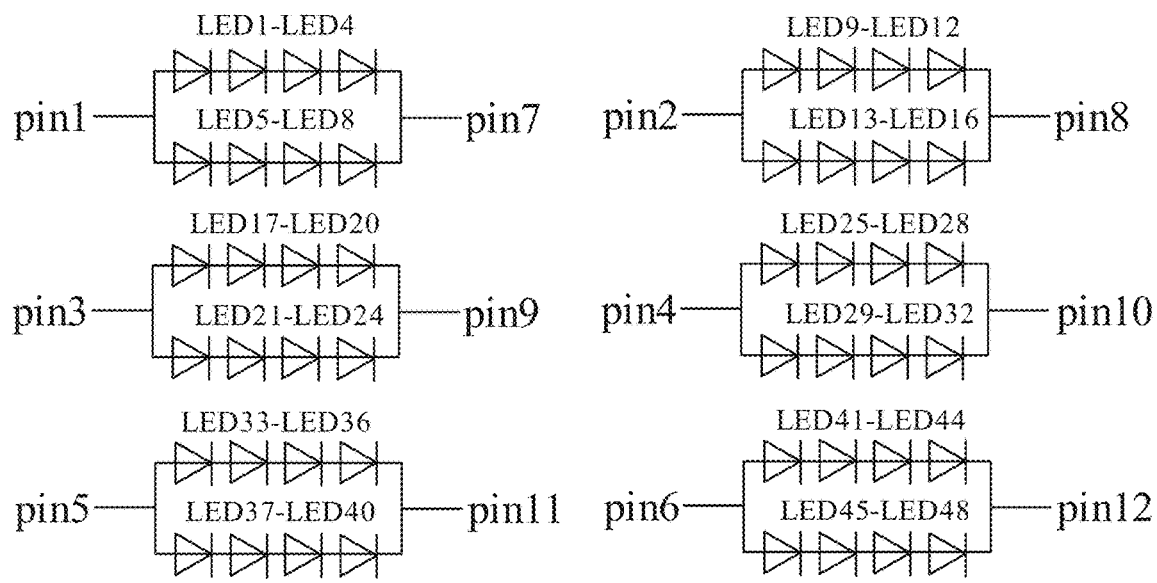
FIG. 5B is a schematic diagram of an equivalent circuit in FIG. 5A.

During specific implementation, in the curved backlight module according to the embodiment of the present disclosure, FIG. 5B is a schematic diagram of an equivalent circuit in FIG. 5A, as shown in FIGS. 5A-5B, at least two adjacent rows of the lamp beads 01 form one backlight partition (local dimming area, LDA). The present disclosure exemplarily describes that two adjacent rows of the lamp beads 01 form one backlight partition LDA, and lamp beads 01 in each of the backlight partitions LDA share a positive electrode and a negative electrode. Particularly, as shown in FIGS. 5A-5B, one lamp bar 21 has 4 lamp beads 01 in the first direction X and 12 lamp beads 01 in the second direction, and 48 lamp beads 01 in total. Every two adjacent rows (8 lamp beads) form one backlight partition LDA, for example, LED 1-LED 8 form one backlight partition, LED 9-LED 16 form one backlight partition, LED 17-LED 24 form one backlight partition, and so on. Positive electrodes of 8 LEDs belonging to the same backlight partition are connected together, and negative electrodes thereof are connected together, so that it is only required to provide 6 pins (pin 1-pin 6) for leading out positive electrode lead-out wires and 6 pins (pin 7-pin 12) for leading out negative electrode lead-out wires. For example, positive electrodes of LED 1-LED 8 are all connected to pin 1, and negative electrodes thereof are all connected to pin 7; positive electrodes of LED 9-LED 16 are all connected to pin 2, and negative electrodes thereof are all connected to pin 8; and positive electrodes of LED 17-LED 24 are all connected to pin 3, and negative electrodes thereof are all connected to pin 9, and so on. In this way, the brightness of each portion of the display area may be controlled by partitions, so that the corresponding light field area may be effectively controlled by partitions, and further the uneven brightness of the module in the dark state may be alleviated.

During specific implementation, in the curved backlight module according to the embodiment of the present disclosure, as shown in FIGS. 3 and 5A, each of the lamp bars 21 is provided with a connector 02, the connector 02 includes binding terminals (described below) corresponding one-to-one to the positive electrodes and the negative electrodes.

Figure 6:
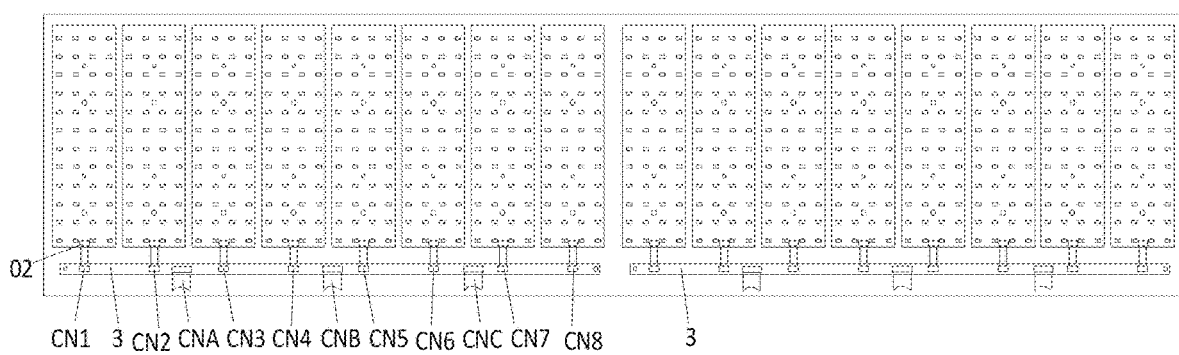
FIG. 6 is a schematic diagram of a connection relation between lamp bars and adapters of the curved backlight module according to the embodiment of the present disclosure.

As shown in FIG. 6, the curved backlight module is provided with, for example, 16 lamp bars 21, each of the lamp bars 21 is provided with 48 lamp beads 01, every four of which are connected in series and every twelve of which are connected in parallel as shown in FIG. 5A; and each of the backlight partitions has 8 lamp beads 01, the first distance P1 between adjacent lamp beads 01 in the first direction X is 18 mm, the second distance P2 between adjacent lamp beads 01 in the second direction Y is 16 mm (see FIG. 5A), and the values of H/P1 and H/P2 are 1 and 1.125 respectively, to ensure the uniformity of the central brightness. The curved backlight module further includes at least two adapters 3 (2 adapters, for example), the adapters 3 are used for connecting the lamp bars 21 to a circuit driving board. Each of the adapters 3 is provided with a plurality of input interfaces (8 input interfaces, for example, CN 1-CN 8) and a plurality of output interfaces (CN A, CN B, CN C), the input interfaces (CN 1-CN 8) on each of the adapters 3 are electrically connected one-to-one to the connectors 02 on the lamp bars 21, that is, the number of the input interfaces (CN 1-CN 8) is the same as that of the lamp bars 21, and the number of the output interfaces (3 output interfaces, for example, CN A, CN B, CN C) is less than that of the input interfaces (CN 1-CN 8). Particularly, each curved backlight module is provided with 2 adapters 3; each of the adapters 3 is provided with eight input interfaces, which are defined as CN 1, CN 2, . . . CN 8, respectively; the eight input interfaces are connected one-to-one to the connectors 02 on the lamp bars 21 through wires; each of the adapters 3 is provided with 3 output interfaces, which are defined as CN A, CN B, and CN C, respectively; and the three output interfaces are connected to a power supply board through wires.

Figure 7A:
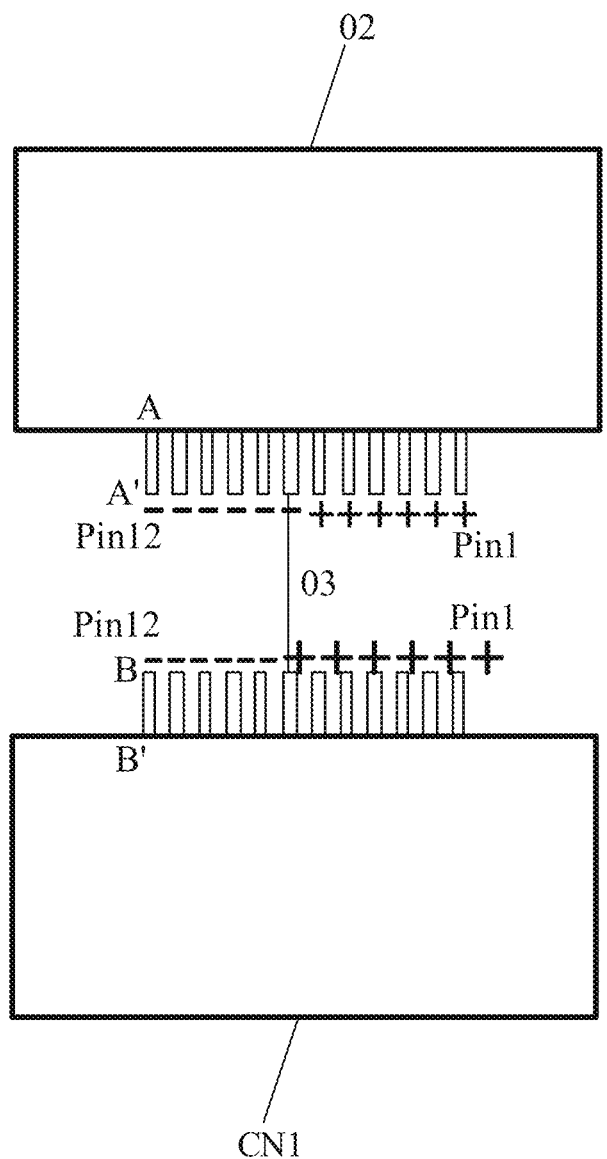
FIG. 7A is a schematic diagram of a connection relation between a connector on the lamp bar and an input interface of the adapter.
Figure 7B:
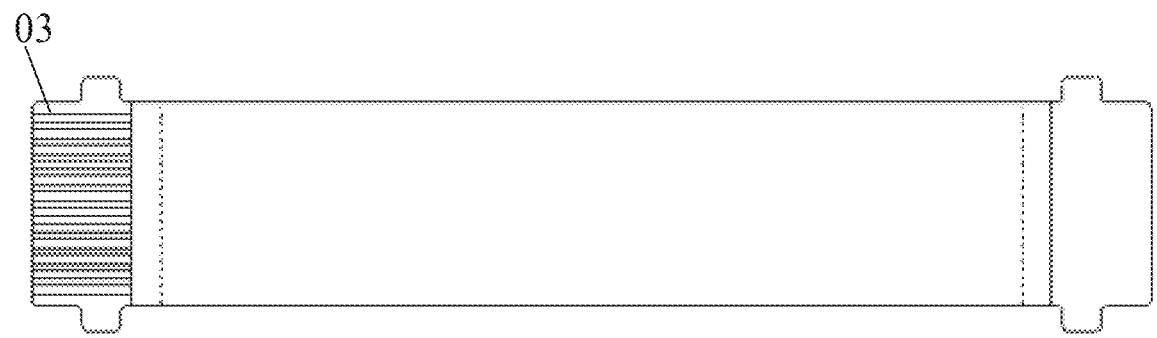
FIG. 7B is a schematic diagram of a connection wire 03 between the connector and the input interface in FIG. 7A.
Figure 7C:
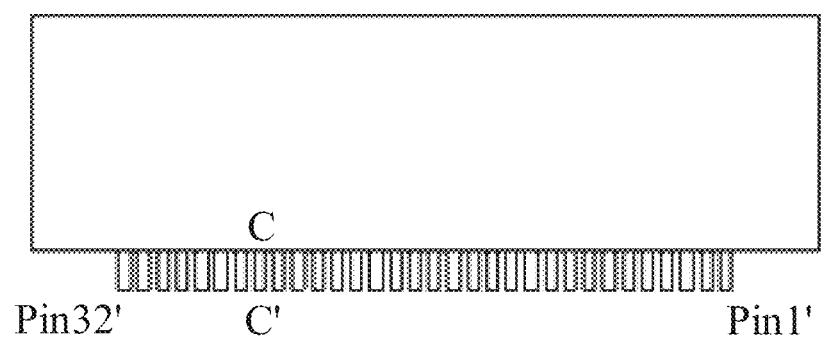
FIG. 7C is a schematic diagram of an output interface on the adapter.
Figure 7D:
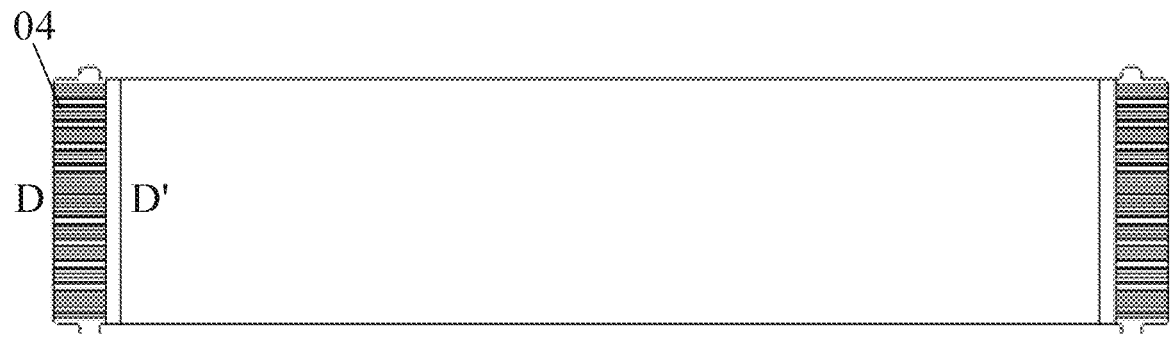
FIG. 7D is a schematic diagram of a connection wire 04 between the output interface on the adapter and a power supply.

Particularly, as shown in FIGS. 7A-7D, the input interfaces (only CN 1-CN 3 are shown) on each of the adapters 3 are each provided with a plurality of input terminals (pin 1'-pin 12'), and the output interfaces (only CN A is shown) on each of the adapters 3 are each provided with a plurality of output terminals (pin 1"-pin 32"). FIG. 7A is a schematic diagram of the connector 02 on the lamp bar 21 and the input interface (CN 1, for example) on the adapter 3, and FIG. 7B shows a connection wire 03 between the connector 02 and the input interface (CN 1, for example); where first ends A of pin 1-pin 12 of the connector 02 are separately connected to the positive electrodes and the negative electrodes of the backlight partitions, and second ends A' of pin 1-pin 12 of the connector 02 are connected to first ends B of pin 1'-pin 12' of the input interface on the adapter 3 through the connection wire 03 (only one connection wire 03 is shown). FIG. 7C shows the output interfaces (CN A-CN C) on the adapter 3; where each of the output interfaces is provided with 32 pins, which are defined as pin 1"-pin 32", respectively; pins 1-16 are positive electrodes, and pins 17-32 are negative electrodes; and second ends B' of pin 1'-pin 12' of the input interfaces (CN 1, for example) are connected to first ends C of pin 1"-pin 32" of the output interfaces through wires. FIG. 7D shows a connection wire 04 between the adapter 3 and the power supply board, where second ends C' of pin 1"-pin 32" of the output interfaces are connected to a first end D of the connection wire 04, and a second end D' of the connection wire 04 is connected to the power supply board. That is, in the present disclosure, by additionally arranging at least two adapters 3, the positive electrodes and the negative electrodes of the lamp beads on the lamp bars 21 may be connected to the power supply board.

During specific implementation, for a symmetric design, in the curved backlight module according to the embodiment of the present disclosure, as shown in FIG. 6, the number of the lamp bars 21 connected to each of the adapters 3 are the same.

Figure 8:
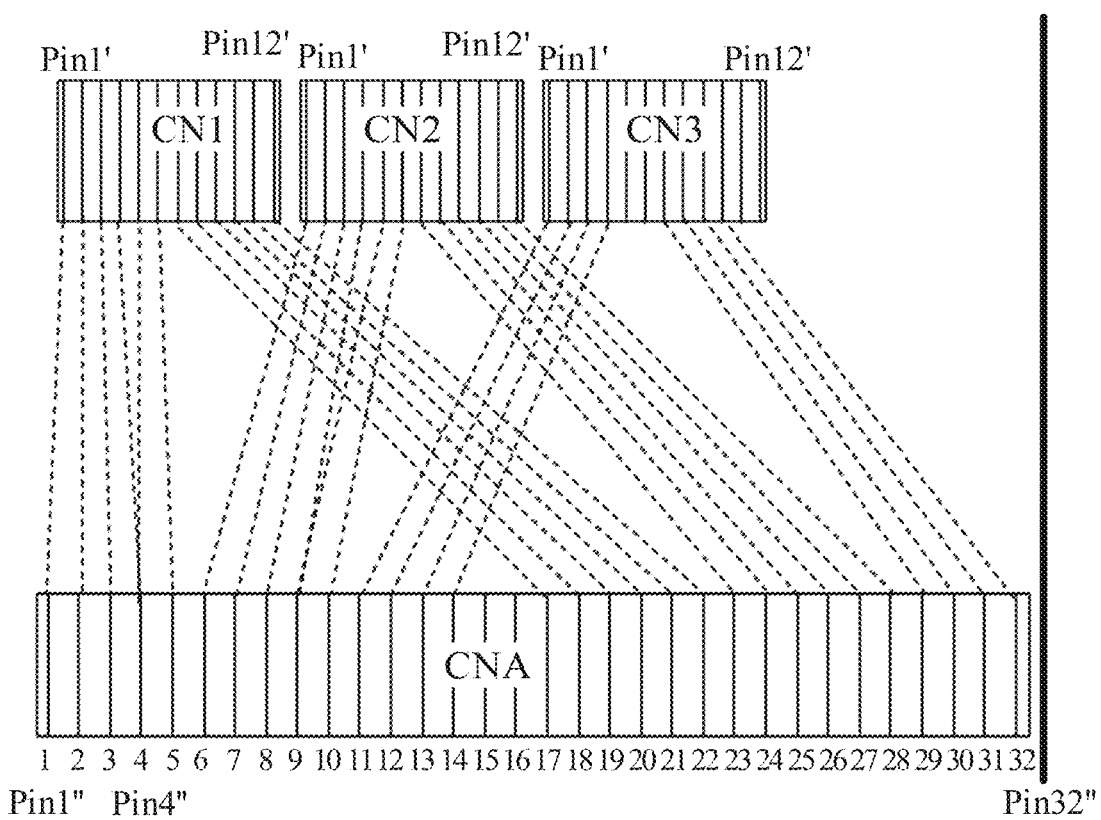
FIG. 8 is a schematic diagram of a connection relation between the input interfaces and the output interface on the adapter of the curved backlight module according to the embodiment of the present disclosure.

During specific implementation, in the curved backlight module according to the embodiment of the present disclosure, FIG. 8 is a schematic diagram of a connection relation between the input terminals (pin 1'-pin 12') of the input interfaces and the output terminals (pin 1"-pin 32") of the output interface, and Table 2 is a corresponding connection relation between all the input terminals and all the output terminals on one adapter corresponding to FIG. 8. As shown in FIG. 8 and Table 2, the total number (12 multiplied by 8 equals 96) of the input terminals (pin 1'-pin 12') on each of the adapters 3 is the same as the total number (32 multiplied by 3 equals 96) of the output terminals (pin 1"-pin 32").

Each of the input terminals (pin 1', for example) is electrically connected to one output terminal (pin 1", for example), some of the output terminals (pin 1"-pin 32") are floating terminals NCs, and one output terminal (pin 4", for example) is electrically connected to at least two input terminals (pin 4' and pin 5'). For example, with respect to the connection relation between output terminals 1-14 of CN B and input terminals of CN 3-CN 6 in Table 2, pins 1-14 of the output interface CN B correspond to pins 5-6 of the input interface CN 3, pins 1-6 of CN 4, pins 1-6 of CN 5, and pins 1-2 of CN 6; that is, 16 input pins correspond to 14 output pins, and two routing wires (positive electrode routing wires or negative electrode routing wires) are merged with other routing wires, so that wire outlets of the lamp bars on a backplane may be reduced, and the strength of the backplane is improved.

TABLE 2

| | | | | | |
|---|---|---|---|---|---|
| CN A 1-14 | CN 1 1-6 | CN B 1-14 | CN 3 5-6 | CN C 1-14 | CN 6 3-6 |
| | CN 2 1-6 | | CN 4 1-6 | | CN 7 1-6 |
| | CN 3 1-4 | | CN 5 1-6 | | CN 8 1-6 |
| | — | | CN 6 1-2 | | — |
| CN A 15 | NC | CN B 15 | NC | CN C 15 | NC |
| CN A 16 | NC | CN B 16 | NC | CN C 16 | NC |
| CN A 17 | CN 1 7 | CN B 17 | CN 3 11 | CN C 17 | CN 6 9 |
| CN A 18 | CN 1 8 | CN B 18 | CN 3 12 | CN C 18 | CN 6 10 |
| CN A 19 | CN 1 9 | CN B 19 | CN 4 7 | CN C 19 | CN 6 11 |
| CN A 20 | CN 1 10 | CN B 20 | CN 4 8 | CN C 20 | CN 6 12 |
| CN A 21 | CN 1 11 | CN B 21 | CN 4 9 | CN C 21 | CN 7 7 |
| CN A 22 | CN 1 12 | CN B 22 | CN 4 10 | CN C 22 | CN 7 8 |
| CN A 23 | CN 2 7 | CN B 23 | CN 4 11 | CN C 23 | CN 7 9 |
| CN A 24 | CN 2 8 | CN B 24 | CN 4 12 | CN C 24 | CN 7 10 |
| CN A 25 | CN 2 9 | CN B 25 | CN 5 7 | CN C 25 | CN 7 11 |
| CN A 26 | CN 2 10 | CN B 26 | CN 5 8 | CN C 26 | CN 7 12 |
| CN A 27 | CN 2 11 | CN B 27 | CN 5 9 | CN C 27 | CN 8 7 |
| CN A 28 | CN 2 12 | CN B 28 | CN 5 10 | CN C 28 | CN 8 8 |
| CN A 29 | CN 3 7 | CN B 29 | CN 5 11 | CN C 29 | CN 8 9 |
| CN A 30 | CN 3 8 | CN B 30 | CN 5 12 | CN C 30 | CN 8 10 |
| CN A 31 | CN 3 9 | CN B 31 | CN 6 7 | CN C 31 | CN 8 10 |
| CN A 32 | CN 3 10 | CN B 32 | CN 6 8 | CN C 32 | CN 8 11 |

Correspondingly, the embodiment of the present disclosure further provides a display device. As shown in FIG. 2, the display device includes: a display panel 4, and the above curved backlight module located at a light incident side of the display panel 4.

Particularly, as shown in FIG. 2, the display device is structurally symmetric up and down as well as left and right, with the same design.

Figure 9:
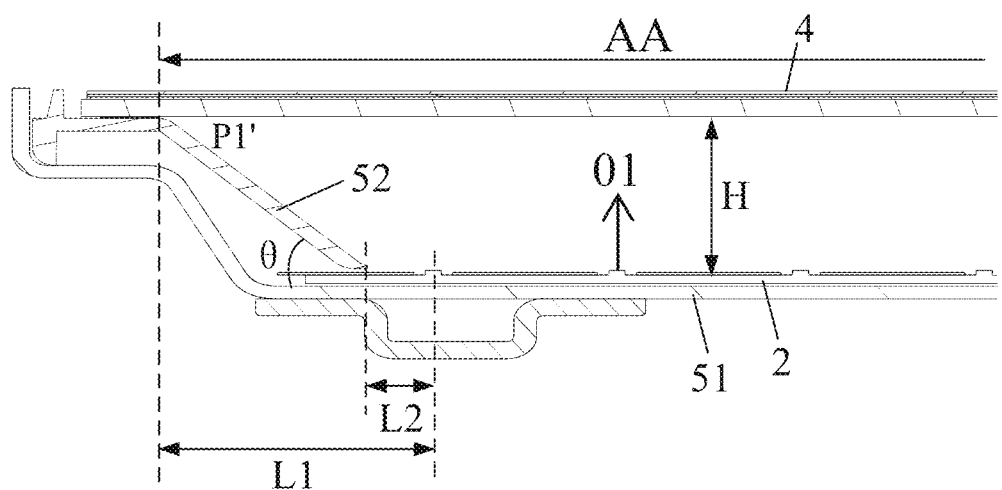
FIG. 9 is an enlarged schematic diagram of a local structure in FIG. 2.

During specific implementation, in order to further alleviate light leakage at four corners of a curved surface in a dark state, in the display device according to the embodiment of the present disclosure, FIG. 9 is an enlarged schematic diagram of a part in FIG. 2, as shown in FIG. 9, the display panel 4 has a display area AA, and a distance L1 between a lamp bead 01 located at an edge of the curved backlight module and an edge of the display area AA is less than or equal to ½ of the distance (a first distance P1) between adjacent lamp beads 01. Particularly, the distance L1 between the lamp bead 01 located at the edge of the curved backlight module and the edge of the display area AA is 2 mm-15 mm.

During specific implementation, as shown in FIGS. 2 and 9, the display device according to the embodiment of the present disclosure further includes a mold frame used for fixing the curved backlight module to the light incident side of the display panel 4; a lamp board 2 of the curved backlight module is fixed to a bottom wall 51, facing the display panel 4, of the mold frame; a side wall 52 of the mold frame is arranged obliquely; and an included angle θ between an extension direction of the side wall 52 and a first direction X is less than or equal to 90°.

During specific implementation, in the display device according to the embodiment of the present disclosure, as shown in FIG. 9, a distance L2 between the lamp bead 01 located at the edge of the curved backlight module and a left mold frame is 3 mm-4 mm.

During specific implementation, as shown in FIG. 9, the distance between the lamp bead 01 at the edge and the display area AA may be widened, to reduce the number of LEDs, thereby reducing a cost.

During specific implementation, in the display device according to the embodiment of the present disclosure, as shown in FIG. 9, the included angle θ is greater than or equal to 41° and less than or equal to 90°, and within the angle range, the tested uniformity of the light-emitting brightness of the curved backlight module is desirable.

During specific implementation, since light leakage is likely to occur at the four corners of the curved backlight module, in order to increase the light-emitting brightness of the four corners of the curved backlight module, in the display device according to the embodiment of the present disclosure, as shown in FIG. 9, the side wall 52 of the mold frame may be polished, sprayed with a reflective material, or pasted with a silvered reflector, thereby increasing reflectivity of a slope, to increase display brightness of the edge.

It should be noted that the display device according to the embodiment of the present disclosure further includes other functional film layers well known to a person skilled in the art.

During specific implementation, as shown in FIGS. 2 and 9, for a direct-type display product, an optical cavity height H is fixed, and the brightness value (the number of LED lamp beads and a light-emitting angle) is fixed. To simulate a light field distribution on the display surface, a slope angle θ of the mold frame, the distance P between LEDs, the distance L2 between the LED and the edge of the mold frame, and the distance L1 between LED and AA are variables. 3D modeling adopts optics software for simulation, and three variables (according to the rules described above) are adjusted, to simulate the light field distribution in the display area AA. During tests, the inventors of the present disclosure have found that when the optical cavity height H is 18 mm, an LED type is 3014, P1 and P2 are 18 mm and 16 mm respectively, 768 LEDs are provided, and an edge design is as shown in FIGS. 2 and 9, an optimal mold frame angle θ for simulation is 41°.

Figure 10A:
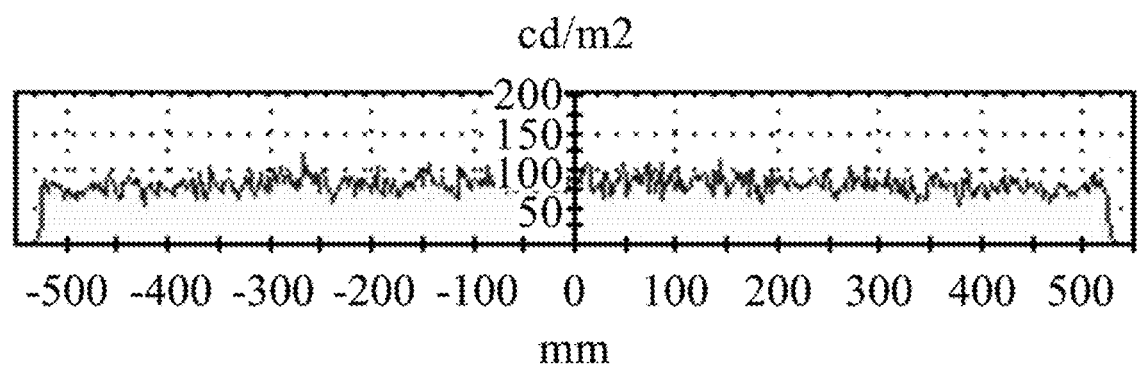
FIG. 10A is brightness uniformity performance in a first direction of a display area AA.
Figure 10B:
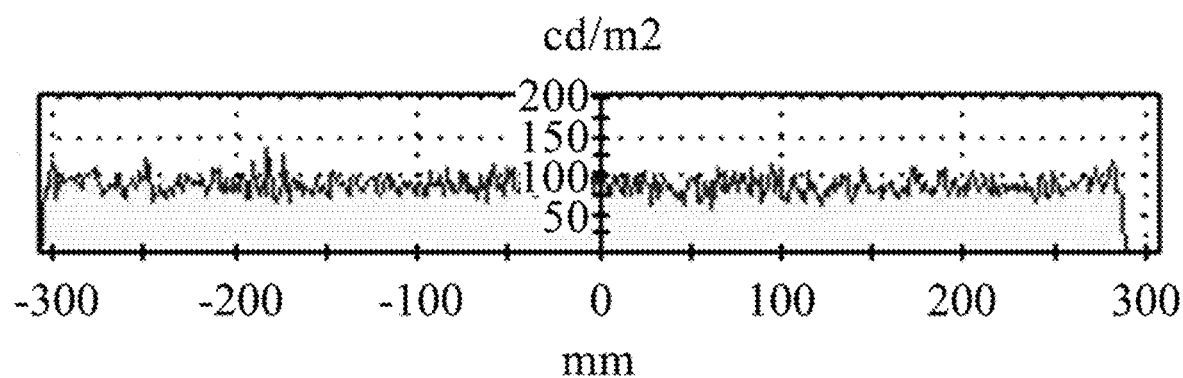
FIG. 10B is brightness uniformity performance in a second direction of the display area AA.

Particularly, the optical cavity height H is fixed as 18 mm, the mold frame angle θ is 41°, and brightness uniformity performance in the first direction and the second direction of the display area AA is simulated. FIG. 10A shows the brightness uniformity performance in the first direction of the display area AA, and FIG. 10B shows the brightness uniformity performance in the second direction of the display area AA. As shown in FIGS. 10A and 10B, it can be seen that the brightness uniformity in the first direction and the second direction is desirable.

Figure 11A:
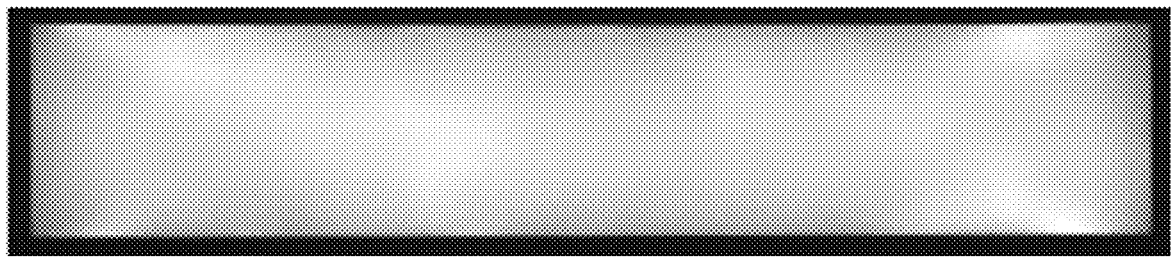
FIG. 11A is a schematic diagram simulating light leakage at four corners of a picture when the curved backlight module is at a gray scale 0.
Figure 11B:
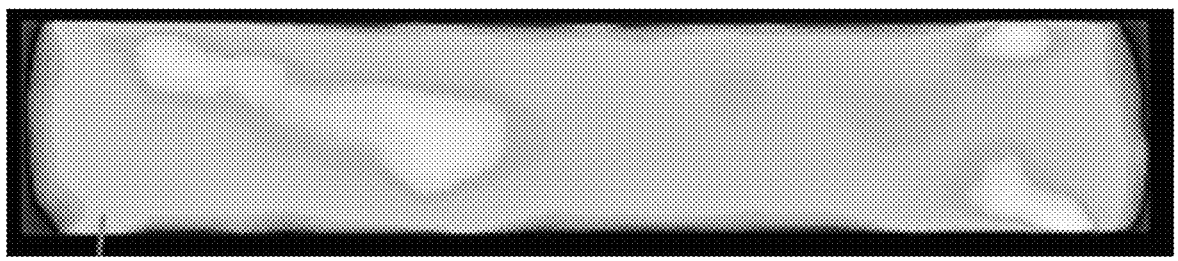
FIG. 11B is a schematic diagram simulating the brightness uniformity of the curved backlight module in a dark state.

The inventors of the present disclosure simulate both the light leakage at four corners of a picture when the curved backlight module is at a gray scale 0, and picture uniformity of the curved backlight module in the dark state in the case of switching off local dimming, as shown in FIG. 11A and FIG. 11B, respectively. As seen from the tests, in the case of switching off local dimming, the picture uniformity when the curved backlight module in the dark state may reach 59.5% (module brightness: maximum point: 1.26 nit, and minimum point: 0.75 nit); and in the case of switching on local dimming, the picture uniformity of the curved backlight module in the dark state may be greater than 85%. For the direct-type curved backlight module, a local dimming function may improve the picture uniformity in the dark state by 1.42 times or so, thereby alleviating a problem of light leakage at the periphery of a curved display.

In conclusion, different serial-parallel relations and distributions of the LED lamp beads are designed according to a size of the display area of the entire module and the optical cavity height, and lamp beads are partitioned for local dimming, so that the central brightness may be uniformized. Moreover, at the edge of the display area, the mold frame is designed into a slope structure as a peripheral reflection structure, so that the peripheral brightness may be increased. The curved backlight module according to the present disclosure may be applied to improve the uniformity of a large-size vehicle-mounted curved display module. Without increasing a design cost of a product, the design mode effectively eliminates dark areas at the periphery and the four corners of the curved backlight module, and improves the uniformity of the picture brightness.

It should be noted that simulation of the light leakage at the four corners of the picture when the curved backlight module is at gray scale 0 and the picture uniformity when the curved backlight module is in the dark state is described as above under the condition that, for example, the size of the display area of the entire module is fixed, whether LEDs are provided with secondary lenses, different serial-parallel relations and distributions of the LED lamp beads are designed, the optical cavity height H is fixed as 18 mm, P1 and P2 are 18 mm and 16 mm respectively, and the lamp beads are partitioned for local dimming. Moreover, the inventors of the present disclosure have concluded that for the distribution parameters of the LED lamp beads of the curved backlight module with different optical cavity heights H, different lamp bead types, and different LED light-emitting angles, the distribution parameters of the LED lamp beads as follows may improve the uniformity of the light-emitting brightness of the curved backlight module, as shown in Tables 3 and 4.

TABLE 3

Design rules of LED with second lens.

| H (mm) | Type of second lens | LED light-emitting angle | Range of application of LED distance (mm) | LED distance ratio |
| --- | --- | --- | --- | --- |
| 30-35 | Transmission type | 75°-85° | 120-150 | 1:1.3:1.2 |
| 25-30 | Transmission type | 75°-85° | 120-130 | 1:1.3:1.2 |
| 20-25 | Transmission type | 75°-85° | 90-105 | 1:1.3:1.2 |
| 15-20 | Reflection type | 60°-80° | 110-130 | 1.1:1:1.1 |
| 10-15 | Reflection type | 60°-80° | 100-110 | 1.1:1:1.1 |
| ≤10 | Reflection type/transmission type | 60°-80° | 20-30 | 1:1:1 |

TABLE 4

Design rules of LED without second lens.

| H (mm) | Slope angle (θ) of mold frame | LED light-emitting angle | Range of application of LED distance (mm) | LED distance ratio |
| --- | --- | --- | --- | --- |
| 20-30 | 30°-90° | 120° | 23-29 | 1:1.3:1.1 |
| 15-20 | 40°-90° | | 15-23 | 0.9:1:0.9 |
| <15 | 60°-90° | | ≤7.5 | 0.8:1:0.8 |

According to the curved backlight module and display device according to the embodiments of the present disclosure, different serial-parallel relations and distributions of the LED lamp beads are designed according to the size of the display area of the entire module and the optical cavity height, and the lamp beads are partitioned for local dimming, so that the central brightness may be uniformized. Moreover, at the edge of the display area, the mold frame is designed into the slope structure as the peripheral reflection structure, so that the peripheral brightness may be increased. The curved backlight module according to the present disclosure may be applied to improve the uniformity of the large-size vehicle-mounted curved display module. Without increasing the design cost of the product, the design mode effectively eliminates dark areas at the periphery and the four corners of the curved backlight module, and improves the uniformity of the picture brightness.

Although the preferred embodiments of the present disclosure have been described, a person skilled in the art, upon attaining a basic inventive concept, may make additional alterations and modifications to these embodiments. Hence, it is intended that the appended claims be interpreted as including the preferred embodiments and all the alterations and modifications that fall within the scope of the present disclosure.

Obviously, a person skilled in the art may make various amendments and variations to the embodiments of the present disclosure without departing from the spirit and scope of the embodiments of the present disclosure. Therefore, it is intended that the present disclosure also includes these amendments and variations if these amendments and variations to the embodiments of the present disclosure fall within the scope of the claims of the present disclosure and the equivalent art thereof.

What is claimed is:

1. A curved backlight module, comprising:
an optical film and a lamp board which are oppositely arranged, wherein a distance between the optical film and the lamp board refers to an optical cavity height;
wherein the lamp board has a plurality of lamp bars which extend in a first direction and are arranged in a second direction, a plurality of lamp beads distributed in an array are provided on each of the plurality of lamp bars, and distribution parameters of the plurality of lamp beads on each of the plurality of lamp bars are identical;
on each of the plurality of lamp bars, a first distance is provided between two adjacent lamp beads in the first direction, and a second distance is provided between two adjacent lamp beads in the second direction; and
the first distance and the second distance are adjusted, to enable a ratio of the optical cavity height to the first distance and a ratio of the optical cavity height to the second distance to be both greater than a first preset value, and a difference between the ratio of the optical cavity height to the first distance and the ratio of the optical cavity height to the second distance to be less than a second preset value; and further enable uniformity of light-emitting brightness of the curved backlight module to be not less than 75%.

2. The curved backlight module according to claim 1, wherein when the plurality of lamp beads are provided with secondary lenses, the ratio of the optical cavity height to the first distance is greater than or equal to 0.35 and less than or equal to 1, and the ratio of the optical cavity height to the second distance is greater than or equal to 0.35 and less than or equal to 1;

when the plurality of lamp beads are not provided with secondary lenses, the ratio of the optical cavity height to the first distance is greater than or equal to 1, and the ratio of the optical cavity height to the second distance is greater than or equal to 1.

3. The curved backlight module according to claim 1, wherein in the first direction, a first distance between adjacent lamp beads on a lamp bar close to an edge of the lamp board is less than a first distance between adjacent lamp beads on a lamp bar close to a center of the lamp board, and the first distance between adjacent lamp beads on the lamp bar close to the center of the lamp board is less than a first distance between adjacent lamp beads on a lamp bar between the lamp bar close to the edge of the lamp board and the lamp bar close to the center of the lamp board; and in the second direction, a second distance between adjacent lamp beads on the lamp bar close to the edge of the lamp board is less than a second distance between adjacent lamp beads on the lamp bar close to the center of the lamp board, and the second distance between adjacent lamp beads on the lamp bar close to the center of the lamp board is less than a second distance between adjacent lamp beads on the lamp bar between the lamp bar close to the edge of the lamp board and the lamp bar close to the center of the lamp board.

4. The curved backlight module according to claim 1, wherein on each of the plurality of lamp bars, a quantity of lamp beads in the first direction is greater than 1, the lamp beads in the first direction are connected in series, and lamp beads in the second direction are connected in parallel.

5. The curved backlight module according to claim 1, wherein at least two adjacent rows of the plurality of lamp beads form one backlight partition, and lamp beads in each backlight partition share a positive electrode and a negative electrode.

6. The curved backlight module according to claim 5, wherein each of the plurality of lamp bars has a connector, and the connector comprises binding terminals corresponding one-to-one to positive electrodes and negative electrodes; and the curved backlight module further comprises at least two adapters, each of the at least two adapters comprises a plurality of input interfaces and a plurality of output interfaces, the input interfaces on the each adapter are electrically connected one-to-one to connectors on the lamp bars, and a quantity of the output interfaces are less than that of the input interfaces.

7. The curved backlight module according to claim 6, wherein a quantity of the lamp bars connected to the each adapter are identical.

8. The curved backlight module according to claim 6, wherein the input interfaces on the each adapter are each provided with a plurality of input terminals, and the output interfaces on the each adapter are each provided with a plurality of output terminals, and on the each adapter, a total number of the input terminals is same as that of the output terminals; and each of the input terminals is electrically connected to one of the output terminals, some of the output terminals are floating terminals, and one of the output terminals is electrically connected to at least two of the input terminals.

9. A display device, comprising a display panel, and the curved backlight module according to claim 1 arranged at a light incident side of the display panel.

10. The display device according to claim 9, wherein the display panel has a display area, and a distance between a lamp bead arranged at an edge of the curved backlight module and an edge of the display area is less than or equal to ½ of the first distance between adjacent lamp beads.

11. The display device according to claim 9, further comprising: a mold frame for fixing the curved backlight module to the light incident side of the display panel;

wherein the lamp board of the curved backlight module is fixed to a bottom wall, facing the display panel, of the mold frame; a side wall of the mold frame is arranged obliquely; and an included angle θ between an extension direction of the side wall and the first direction is less than or equal to 90°.

12. The display device according to claim 11, wherein the included angle is greater than or equal to 41° and less than or equal to 90°.

13. The display device according to claim 11, wherein the side wall is polished, sprayed with a reflective material, or pasted with a silvered reflector.

* * * * *